US008688486B2

(12) United States Patent
Griffin (10) Patent No.: US 8,688,486 B2
(45) Date of Patent: Apr. 1, 2014

(54) SYSTEM, METHOD AND PROGRAM FOR SETTING WAGE FOR CALL CENTER PERSONNEL

(75) Inventor: John Daniel Griffin, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2104 days.

(21) Appl. No.: 11/777,571

(22) Filed: Jul. 13, 2007

(65) Prior Publication Data

US 2009/0016521 A1    Jan. 15, 2009

(51) Int. Cl.
*G06Q 10/00* (2012.01)

(52) U.S. Cl.
USPC ........................................................ 705/7.11

(58) Field of Classification Search
USPC ........... 705/7–11, 7.11, 7.13, 7.15, 7.16, 320; 379/265.01, 265.02
See application file for complete search history.

(56) References Cited

U.S. PATENT DOCUMENTS

| | | | |
|---|---|---|---|
| 4,200,772 | A | 4/1980 | Vicari et al. |
| 5,185,786 | A | 2/1993 | Zwick |
| 5,509,055 | A | 4/1996 | Ehrlich et al. |
| 5,903,641 | A * | 5/1999 | Tonisson .................. 379/265.12 |
| 6,188,673 | B1 | 2/2001 | Bauer et al. |
| 6,192,122 | B1 | 2/2001 | Flockhart et al. |
| 6,310,951 | B1 | 10/2001 | Wineberg et al. |
| 6,408,277 | B1 | 6/2002 | Nelken |
| 6,763,104 | B1 | 7/2004 | Judkins et al. |
| 6,766,013 | B2 | 7/2004 | Flockhart et al. |
| 6,845,155 | B2 | 1/2005 | Elsey |
| 2002/0060988 | A1 * | 5/2002 | Shtivelman .................... 370/259 |
| 2003/0233278 | A1 * | 12/2003 | Marshall .......................... 705/14 |
| 2004/0210475 | A1 * | 10/2004 | Starnes et al. .................. 705/11 |
| 2005/0129215 | A1 * | 6/2005 | Parker ....................... 379/265.06 |
| 2005/0177380 | A1 * | 8/2005 | Pritchard et al. .................. 705/1 |
| 2005/0195960 | A1 | 9/2005 | Shaffer et al. |

(Continued)

FOREIGN PATENT DOCUMENTS

JP    2003150891 A    5/2003
WO    WO 0180540 A1    10/2001

OTHER PUBLICATIONS

Business Editors/high-Tech Writers. First Tennessee Bank Selects Motiva to Manage Incentive Compensation. May 14, 2002. Businesswire, p. 1-2.*

(Continued)

*Primary Examiner* — Stephanie Delich
(74) *Attorney, Agent, or Firm* — Arthur J. Samodovitz (57) ABSTRACT

System, method and program product for dynamically setting a wage offered to a multiplicity of inactive call center personnel. First program instructions automatically estimate a wait time for calls to a call center. The calls are handled by a plurality of active call center personnel. Second program instructions automatically determine and set a wage, based in part on the estimated wait time, offered to inactive call center personnel to induce them to become active call center personnel to handle calls. Third program instructions, responsive to a request by an inactive call center person to become active at said wage, automatically designate the requesting inactive call center person as active at the wage and assign a call to the requesting inactive call center personnel that was designated as active. Program instructions also set a renewal wage paid to active call center personnel, based in part on the estimated wait time, to induce the active call center personnel to remain active.

4 Claims, 4 Drawing Sheets

(56) References Cited

U.S. PATENT DOCUMENTS

2007/0050238 A1* 3/2007 Carr et al. .................. 705/11
2007/0133781 A1   6/2007 Febonio et al.
2007/0276722 A1* 11/2007 Silvera et al. ............... 705/11
2008/0147470 A1* 6/2008 Johri et al. .................. 705/9

OTHER PUBLICATIONS

Gerhart, Barry and Milkovich, George. Organizational Differences in Managerial Compensation and Financial Performance. Academy of Management Journal; Dec. 1990 vol. 33 No. 4 pp. 663-691.*

* cited by examiner

FIG. 4

SYSTEM, METHOD AND PROGRAM FOR SETTING WAGE FOR CALL CENTER PERSONNEL

FIELD OF THE INVENTION

The present invention relates generally to call centers, and more specifically to an automated technique for setting a wage for call center personnel.

BACKGROUND OF THE INVENTION

Call centers are well known today to handle a variety of requests or problems. For example, some call centers in the form of "help desks" assist customers with problems with their computer hardware or software or other products. Other call centers assist customers with purchasing products or services or in billing matters or provide information about products or services. A large call center typically employs many personnel to assist the caller, to help fix a problem, answer the callers' questions or transact business. A large call center may employ personnel with different skills to match the service requested by the caller. There are many known techniques to route a call to a qualified call center personnel such as disclosed in U.S. Pat. Nos. 6,192,122 and 6,763,104. U.S. Pat. No. 5,509,055 determines a need for additional call center personnel based on the number of dropped calls, i.e. a call that is not answered fast enough to satisfy the customer where the caller hangs up before the call is answered. U.S. Pat. No. 6,188,673 determines staffing requirements for a call center based on predicted call volume. JP2003-150891A sets wages of call center personnel based on their skill level.

While the foregoing techniques improve call center operation, they do not set the wage for call center personnel in an optimum manner.

Accordingly, an object of the present invention is to optimize the wages for call center personnel.

SUMMARY OF THE INVENTION

The present invention resides in a system, method and program product for dynamically setting a wage offered to a multiplicity of inactive call center personnel. First program instructions automatically estimate a wait time for calls to a call center. The calls are handled by a plurality of active call center personnel. Second program instructions automatically determine and set a wage, based in part on the estimated wait time, offered to inactive call center personnel to induce them to become active call center personnel to handle calls. Third program instructions, responsive to a request by an inactive call center person to become active at said wage, automatically designate the requesting inactive call center person as active at the wage and assign a call to the requesting inactive call center personnel that was designated as active.

According to a feature of the present invention, the second program instructions are responsive to the estimated wait time being greater than an upper threshold to determine and set the wage offered to inactive call center personnel to be higher than a wage offered to inactive call center personnel during an immediately prior interval.

According to another feature of the present invention, the second program instructions are responsive to the estimated wait time being less than a lower threshold to determine and set the wage offered to inactive call center personnel to be lower than a wage offered to inactive call center personnel during an immediately prior interval.

The present invention also resides in a system, method and computer program product for dynamically setting a wage offered to a multiplicity of active-status call center personnel. First program instructions automatically estimate a wait time for calls to a call center. The calls are handled by a plurality of active-status call center personnel. Second program instructions automatically determine and set a renewal wage, based in part on the estimated wait time, offered to the active-status call center personnel to renew their active status and thereby continue to handle calls after expiration of respective lock-in periods for the active-status call center personnel in which wages paid to the active call center personnel are fixed. Third program instructions are responsive to expiration of the respective lock-in periods and explicit or implicit indications by the respective active-status call center personnel to renew their active-status at the expiration of respective lock-in periods, to automatically set a wage for the renewing active-status call center personnel at the renewal wage and assign calls to the renewing active-status call center personnel.

DETAILED DESCRIPTION OF THE PREFERRED EMBODIMENTS

Figure 1:
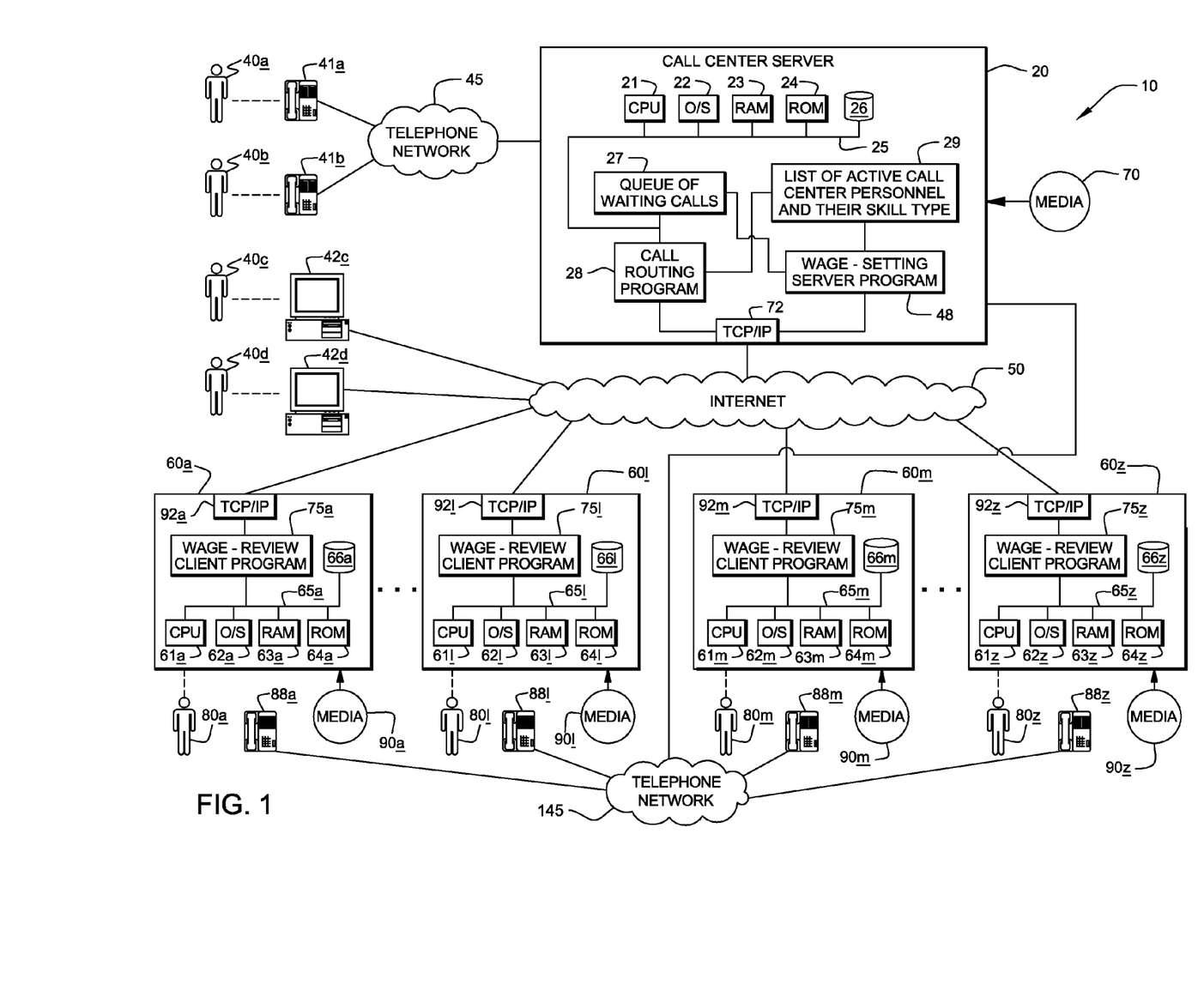
FIG. 1 is a block diagram of wage-setting system, according to the present invention, for a call center.

The present invention will now be described in detail with reference to the figures. FIG. 1 illustrates a wage setting system generally designated 10 for a call center. System 10 includes a call center server 20 with a known CPU 21, operating system 22, RAM 23 and ROM 24 on a common bus 25 and storage 26. System 10 also includes a known call routing program 28 which routes calls to available, qualified call center personnel based on their skill type (compared to the skill required to handle the call), cost and availability. There are many known algorithms that can be implemented by call routing program 48, such as to route the call to the next available call center personnel with the requisite skill level or to route the call to the longest waiting call center personnel with the requisite skill level. Call routing program 28 can route the calls based in part on information provided by the caller describing the nature of the call. For example, call routing program 28 can make a series of telephone prompts to callers 40a,b via respective telephones 41a,b (via a telephone network 45) to identify the nature of the problem, or requested help, information, transaction or other service. For example, in the case of a computer help desk, the telephone prompts can elicit from the caller the type of product for which the caller needs help such as the type of computer hardware or software for which the caller is experiencing a problem or needs other assistance. In the case of a request for product information, the telephone prompts can elicit from the caller the type of product for which the caller needs information. In the case of a request to perform a service such as pay a bill or turn-on or repair cable television, the telephone prompts can elicit from the caller the type of service requested and the type of product requiring or associated with the service. The telephone prompts can elicit a wide range of information needed to route the call to a qualified call center person. With the foregoing information and a listing 29 of available and active service people and their respective skills, the call routing program 28 can route the call to a person having the requisite skills and resources to provide the help, product information, transaction or other type of service. Similarly, callers 40c,d using workstations 42c,d can electronically request help, information, a transaction or a service via Internet 50 to call routing program 28, and in response, call routing program 28 provides a data input screen such as a web page by which the caller specifies the nature of the problem or requested help, information, transaction or other service. For example, in the case of a help desk, the data input screen can elicit from the caller the type of product for which the caller needs help such as the type of computer hardware or software. In the case of a request for product information, the data input screen can elicit from the caller the type of product for which the caller needs information. In the case of a request to perform a service such as pay a bill or turn-on or repair cable television, the data input screen can elicit from the caller the type of service requested and the type of product requiring or associated with the service. With the foregoing information and listing 29 of available and active service people and their respective skills, the call routing program 28 can route the call to a person having the requisite skills and resources to provide the help, product information, transaction or other type of service. The foregoing features of computer 20 are Prior Art.

In accordance with the present invention, computer 20 includes a wage-setting server program 48 to dynamically determine and set the wage for call center personnel based on demand for new call center personnel, i.e. the need for additional or fewer call center personnel to handle the current rate of calls. There is an existing pool of enrolled and active call center personnel 80a-l (with telephones 88a-l and workstations 60a-l), as well as an existing pool of enrolled but inactive call center personnel 80m-z (with telephones 88m-z and workstations 60m-z). All of enrolled personnel 80a-z have passed hiring criteria by the owner of the call center and classified by skill type. In one embodiment of the present invention, all of the enrolled call center personnel are entitled to join the pool at any time or exit the pool at any time (after they complete their current call) based on the applicable wage. (In another embodiment of the present invention, if the current call volume is low and can readily be handled by the existing pool of active call center personnel with a minimum wait time, then wage-setting program 48 prevents any enrolled inactive call center personnel from joining the pool.) If the rate of calls substantially exceeds the rate of calls at which the current number and type of active call center personnel can handle in a timely manner, then program 48 will increase the wage (such as an hourly wage or per-call fee) to attract additional enrolled but currently inactive call center personnel of appropriate skill type to join the pool of existing active call center personnel. Conversely, if the rate of calls is substantially less than the rate of calls at which the current number and type of call center personnel can handle in a timely manner, then program 48 will decrease the wage (such as the hourly wage or per-call fee) to induce some of the existing active call center personnel of the appropriate skill type to exit the pool and become inactive and dissuade other, inactive call center personnel from joining the pool.

Workstations 60a-z of the enrolled call center personnel 80a-z, respectively, include known CPUs 61a-z, operating systems 62a-z, RAM 63a-z and ROM 64a-z on common busses 65a-z, and storage 66a-z, respectively. Workstations 60a-z of the enrolled call center personnel 80a-z, respectively, also include respective wage-reviewing client programs 75a-z, according to the present invention. Programs 75a-z initiate display on the respective workstations 60a-z of respective web pages or other screens listing the current wage offered to enrolled, inactive call center personnel and a "lock-in" time, i.e. a time that an enrolled, inactive call center personnel will be paid the current wage if he or she joins the pool of active call center personnel. For example, the "lock-in" time can be one hour. With this information and using the web page or other screen, an enrolled but inactive call center personnel can join the pool and become active to receive and handle calls. Also, when the lock-in period ends for an enrolled, active call center personnel, he or she will see the current wage being offered to him or her as a renewal. In this embodiment of the present invention, at the end of the lock-in period for each active call center person, program 48 will reset the wage paid to such enrolled, active call center personnel to the wage offered to enrolled, inactive call center personnel (assuming the active employee remains active). Also, programs 75a-z will display a running tally of wages earned by the respective call center personnel during the day, an itemization of the hourly wages paid to the respective call center personnel during the day and a graph of the wages available to enrolled but inactive call center personnel as a function of time during the course of the day. The enrolled call-center personnel can also configure their respective programs 75a-z to provide an audible notification, e-mail, telephone call or page if the current wage offered to enrolled, inactive call center personnel equals or exceeds an amount configured by the respective enrolled inactive call-center personnel.

Figure 2:
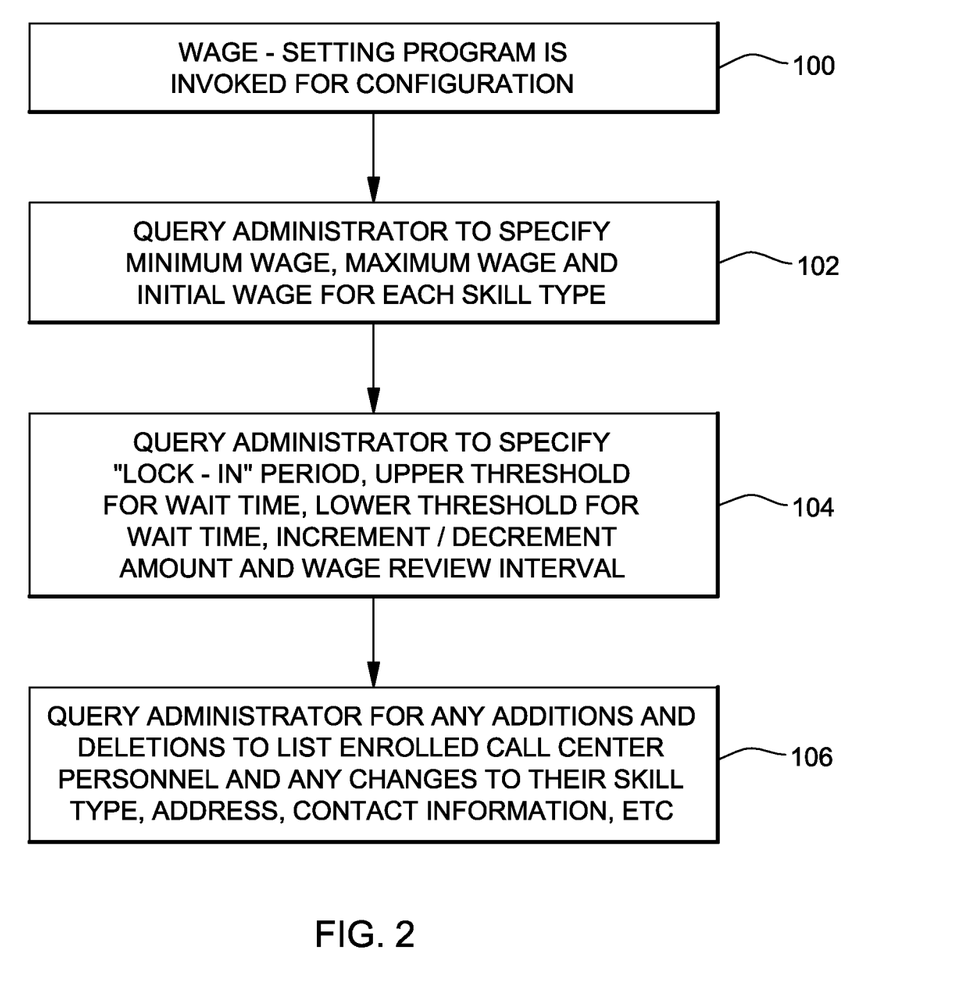
FIG. 2 is a flow chart of a setup/configuration phase for a wage-setting program within the wage setting system of FIG. 1.

FIG. 2 illustrates a set up/configuration phase for wage-setting server program 48. In step 100, an administrator for computer 20 invokes program 48 for set-up/configuration. In response, program 48 queries the administrator to specify a minimum wage, maximum wage and initial wage to be offered at start up of program 48 (step 102). Program 48 also queries the administrator to specify the wage "lock-in" period, such as one hour, an upper threshold for call center wait time, a lower threshold for call center wait time, wage increment/decrement amount(s) and wage review interval (step 104). The wage increment amount is the amount by which program 48 increases the current wage when the call center demand substantially exceeds the handling capacity of the active call center personnel (for each skill) such that the estimated call center wait time exceeds the upper threshold. The wage decrement amount is the amount by which program 48 decreases the current wage when the call center demand is substantially less than the handling capacity of the active call center personnel (for each skill) such that the estimated call center wait time is less than the lower threshold. In the illustrated embodiment, the increment amount is the same as the decrement amount, but in another embodiment of the present invention they are different from each other. The wage review interval, such as one minute, is the interval at which program 48 reevaluates the call center wait time to determine if more or fewer call center personnel are needed, and therefore, whether the wage should be increased, decreased or unchanged. If the call center wait time exceeds the upper threshold, then more call center personnel are needed and program 48 increases the current wage offered to enrolled but inactive call center personnel. Conversely, if the call center wait time is less than the lower threshold, then fewer call center personnel are needed and program 48 decreases the current wage offered to enrolled but inactive personnel (and may prevent enrolled but inactive personnel from joining the pool of active call center personnel). Program 48 also queries the administrator for any additions, deletions or changes to the list of enrolled call center personnel (step 106). The changes can be change in skill level, skill specialty, languages spoken, address, contact information, etc.

Figure 3:
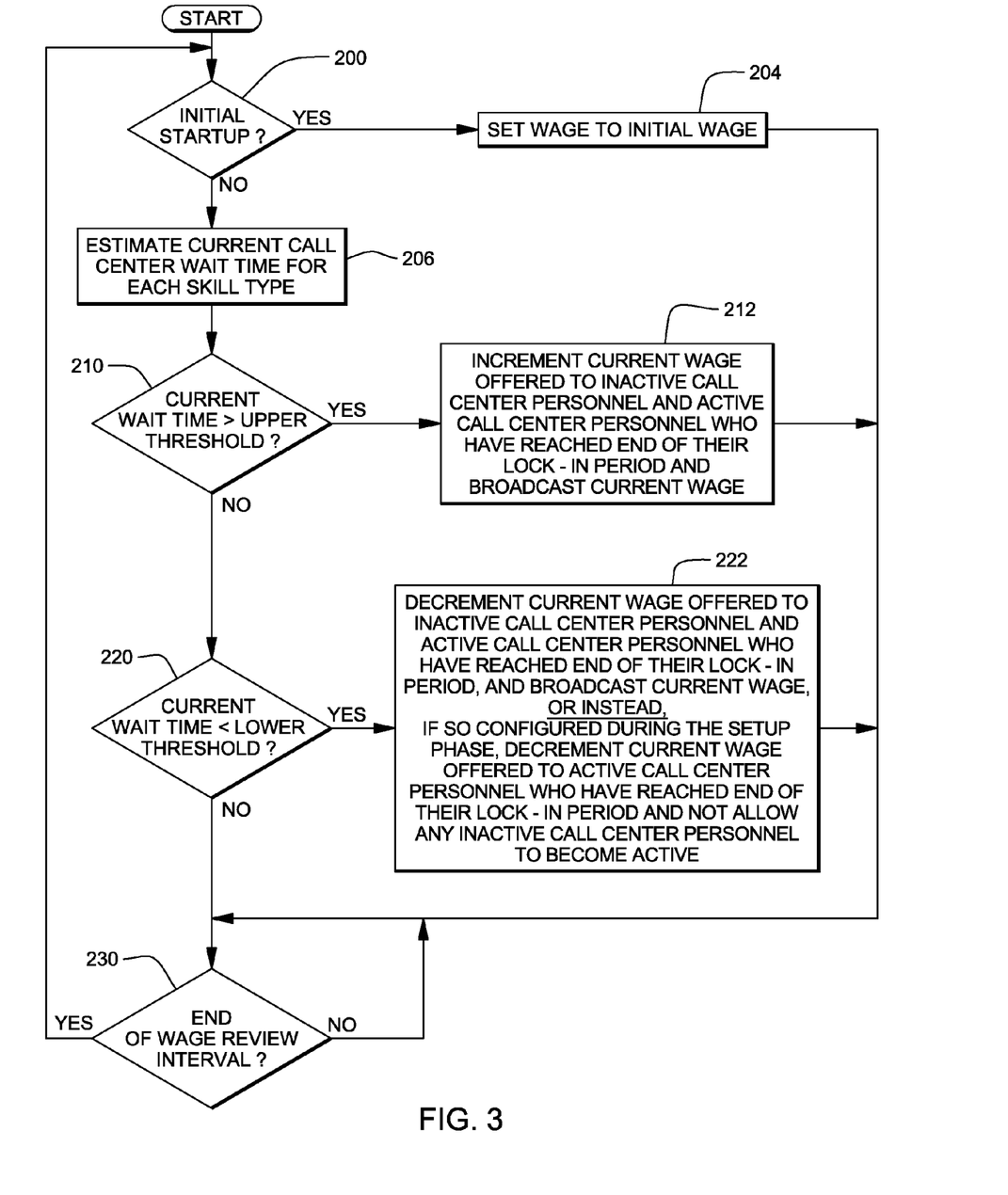
FIG. 3 is a flow chart of function and operation of the wage-setting program within the wage setting system of FIG. 1 in dynamically determining and setting the wage offered to inactive call center personnel and to active call center personnel who have reached an end to their lock-in period.

FIG. 3 illustrates in more detail the function and operation of wage-setting server program 48, after setup/configuration, in dynamically setting the wage offered to enrolled but inactive call center personnel, and to enrolled active call center personnel whose lock-in period has just ended, as described above. In decision 200, program 48 determines if this is initial startup of program 48. If so (decision 200, yes branch), program 48 sets the wage to the initial wage (step 204). If not (decision 200, no branch), then program 48 estimates the current call center wait time for each skill type (step 206). For example, program 48 can estimate the current call center wait time for each skill type by counting the number of waiting calls in each skill-based queue and multiplying the number of waiting calls in each skill-based queue by the average time to handle the respective type of call, and dividing the result by the number of enrolled active call takers assigned to that queue. Alternately, program 48 can estimate the current call center wait time for each skill type by tracking and averaging the actual wait time for calls to each skill type during the last predetermined period. Next, program 48 compares the estimated, current wait time for a call center personnel in each skill type to a respective upper threshold (decision 210). If the estimated current wait time exceeds the respective upper threshold (decision 210, yes branch), then program 48 increases, by the configured wage increment, the current wage to be paid to newly joining, enrolled call center personnel (step 212). For any active call center personnel whose lock-in period has just ended, program 48 will also set their wage to the current wage offered to enrolled but inactive call center personnel (step 212). Also, program 48 broadcasts the new, current wage to workstations 75*a-z* (step 212). If the current wait time for any skill time does not exceed the respective upper threshold (decision 210, no branch), then program 48 compares the current wait time for such skill type to the respective lower threshold (decision 220). If the current wait time for such skill type is less than the respective lower threshold (decision 220, yes branch), then program 48 reduces, by the configured wage decrement amount, the current wage offered to enrolled but inactive call center personnel as well as currently active call center personnel whose lock-in period has just ended, and broadcasts the new, current wage to workstations 75*a-z* (step 222). (If so configured during the setup phase, in step 222, program 48 will decrement the wage offered to active call center personnel who have just completed their lock-in period, and not allow any inactive call center personnel to join the pool of active call center personnel.) At the end of the configured wage review interval (decision 230, yes branch), program 48 loops back to step 200 to repeat the foregoing steps to determine the then current wage to be offered to enrolled but inactive call center personnel for each skill type as well as enrolled but inactive call center personnel whose lock-in period has just ended.

Figure 4:
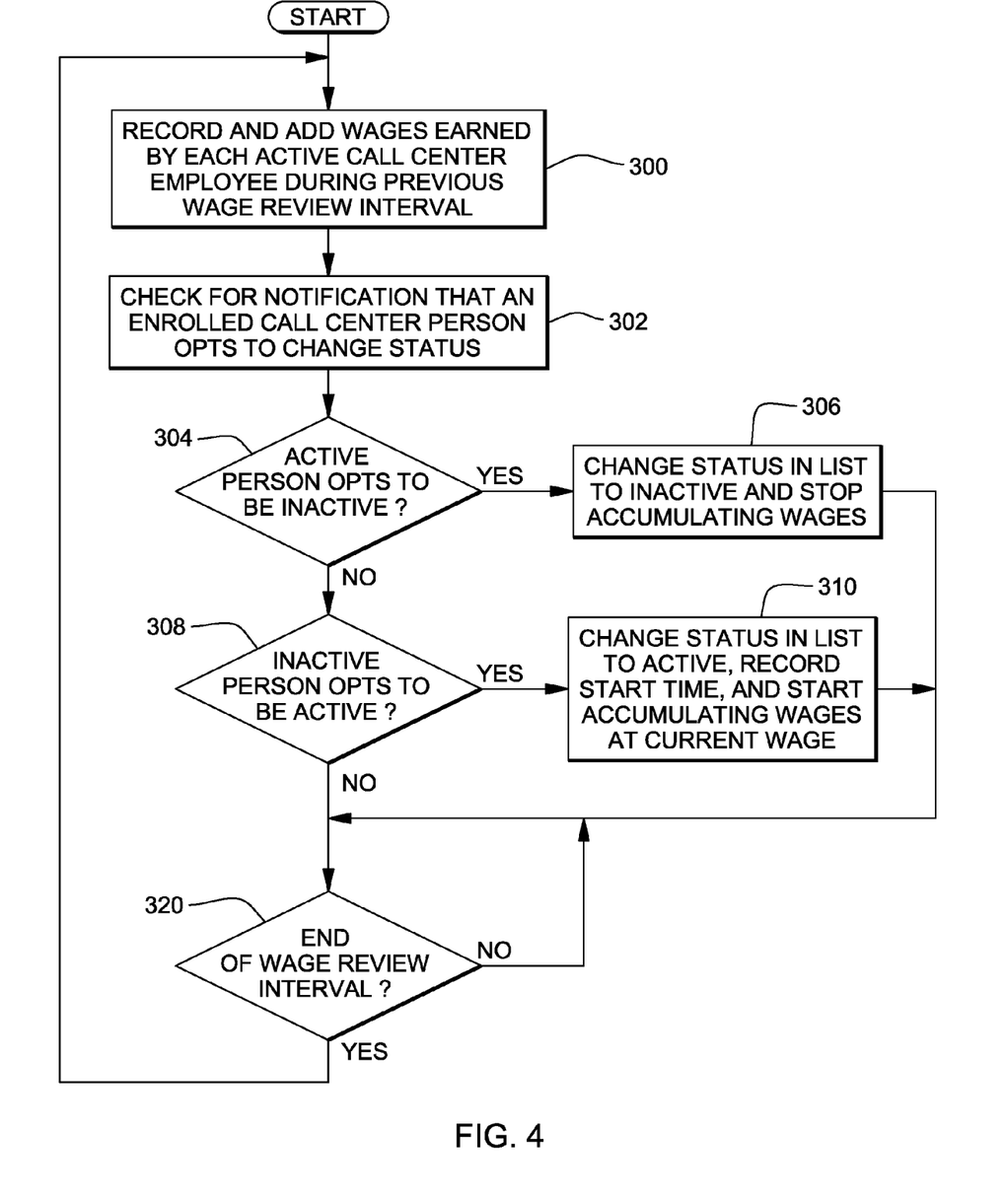
FIG. 4 is a flow chart of function and operation of the wage-setting program within the wage setting system of FIG. 1 in designating enrolled call center personnel as active or inactive, as requested by the call center personnel, and tallying their wages as they are earned.

FIG. 4 illustrates in more detail the function and operation of wage-setting server program 48 in managing enrolled call center personnel as they become active or inactive, and tallying their wages for the day. In step 300, program 48 records and adds the wages earned by each active call center person during the prior wage review interval, based on the wage rate applicable to the respective active call center person. In step 302, program 48 checks for notification from any of workstations 60*a-z* that the respective enrolled call center person opts to change his or her status, i.e. an active call center person opts to become inactive or an inactive call center person opts to become active. Upon receipt of notification that an active call center person opts to become inactive (decision 304, yes branch), program 48 terminates the accumulation of wages of such call center person for the session, notifies such call center person accordingly, and invites such call center person to rejoin the pool later (step 306). Upon receipt of notification that an inactive call center person opts to become active (decision 308, yes branch), program 48 records the start time and current wage for such skill type and updates list 29 with the active status of this call center person (step 310). Program 48 also begins to tally hours and wages of this active call center person for the day and notifies this active call center person accordingly (step 310). At the end of each wage review interval (decision 320, yes branch), program 48 loops back to step 300 to repeat the foregoing steps 300-320.

As each call arrives at call center server 20, call routing program 28 places the call on a queue 31 of waiting calls, determines the type of skill required to handle the call based on telephone prompts or computer queries to the caller, and then routes the call to a qualified, enrolled, active call center personnel who is available based on a known call routing algorithm. For example, the oldest call on the queue for each skill type is routed to the longest waiting call center personnel with the appropriate skill to handle the call.

The following is an example of the function and operation of program 48 for calls requiring one skill type. (Similar steps will occur for calls requiring other skill types.) At initial startup of program 48 at 9:00 AM, program 48 sets the current wage to the initial wage of $10/hour for the skill type and thirty enrolled call center personnel having this skill type opt to become active. Their wage is set to $10/hour for a lock-in period of one hour. The wage increment interval is one minute. From 9:01 AM to 9:09 AM, the estimated call wait time is two minutes which is below the upper threshold of four minutes and above the lower threshold of 10 seconds, so program 48 does not adjust the current wage offered to enrolled, inactive call center personnel. At 9:10, the estimated call wait time is six minutes which is above the upper threshold of four minutes. In response, program 48 increases the current wage offered to enrolled, inactive call center personnel of the requisite skill by the configured wage increment of $0.25/hour to $10.25/hour. In response, three additional enrolled, inactive call center personnel having the requisite skill opt to join the pool and become active, and program 48 sets their wage at $10.25/hour for the next hour. The wage of the first thirty call center personnel remains at $10.00/hour. From 9:11 AM to 9:19 AM the estimated wait time is three minutes which is below the upper threshold of four minutes and above the lower threshold of 10 seconds, so program 48 does not adjust the current wage offered to enrolled, inactive call center personnel. At 9:20 AM, the estimated call wait time is five minutes which is above the upper threshold, so program 48 increases the current wage offered to enrolled, inactive call center personnel by the configured wage increment of $0.25/hour. Thus, program 48 increases the current wage offered to enrolled, inactive call center personnel of the appropriate skill type to $10.50/hour. In response, two additional enrolled but inactive call center personnel having the requisite skill opt to join the pool, and their wage is set at $10.50/hour for the next hour. The wage of the first thirty call center personnel remains at $10.00/hour, and the wage for the next three call center personnel which joined the pool at time 9:10 AM remains at $10.25/hour. From 9:21 AM to 9:54 AM, the estimated wait time is two minutes which is below the upper threshold of four minutes and above the lower threshold of 10 seconds, so program 48 does not adjust the current wage offered to enrolled but inactive call center personnel. At 9:55 AM the estimated wait time is five seconds which is below the lower threshold of ten seconds, so program 48 decreases the current wage offered to enrolled but inactive call center personnel by the configured wage decrement of $0.25/hour. Thus, program 48 decreases the current wage offered to enrolled but inactive call center personnel to $10.25/hour. In response, two enrolled but inactive call center personnel opt to become active and one enrolled active call-taker, who became active at 9:00 AM, decides to end his or her current session and signs off of the system, thereby becoming inactive. This call-taker's wage for this session is calculated as the sum of the hours logged into the system at the respective lock-in rates. Since this call-taker logged in at 9:00 AM at an offered wage of $10.00/hour, his or her wage is calculated as 0.92 hours×$10.00=$9.20. Program 48 designates the two, newly enrolled call-takers as active at $10.25/hour. At 9:56 AM the estimated wait time is four seconds which is below the lower threshold of ten seconds, so program 48 decreases the current wage offered to enrolled but inactive call center personnel by the configured wage decrement of $0.25/hour. Thus, program 48 decreases the current wage offered to enrolled but inactive call center personnel to $10.00/hour. In response, two more enrolled but inactive call center personnel opt to become active. Program 48 designates them as active at $10.00/hour. At 9:57 AM the estimated wait time is two seconds which is below the lower threshold of ten seconds, so program 48 decreases the current wage offered to enrolled but inactive call center personnel by the configured wage decrement of $0.25/hour. Thus, program 48 decreases the current wage offered to enrolled but inactive call center personnel to $9.75/hour. In response, one enrolled but inactive call center personnel opts to become active. In one embodiment of the present invention, program 48 designates him or her as active at $9.75/hour. At 9:58 AM the estimated wait time is two seconds which is below the lower threshold of ten seconds, so program 48 decreases the current wage offered to enrolled but inactive call center personnel by the configured wage decrement of $0.25/hour. Thus, program 48 decreases the current wage offered to enrolled but inactive call center personnel to $9.50/hour. In response, zero enrolled but inactive call center personnel opt to become active at this time. At 9:59 AM the estimated wait time is two seconds which is below the lower threshold of ten seconds, so program 48 decreases the current wage offered to enrolled but inactive call center personnel by the configured wage decrement of $0.25/hour. Thus, program 48 decreases the current wage offered to enrolled but inactive call center personnel to $9.25/hour. In response, zero enrolled but inactive call center personnel opt to become active at this time. At 10:00 AM the estimated wait time is two seconds which is below the lower threshold of ten seconds, so program 48 decreases the current wage offered to enrolled but inactive call center personnel by the configured wage decrement of $0.25/hour. Thus, program 48 decreases the current wage offered to enrolled but inactive call center personnel to $9.00/hour. In response, zero enrolled but inactive call center personnel opt to become active at this time. Also, at this time, program 48 adjusts the wage paid to enrolled, active call center personnel who became active at 9:00 AM and whose lock-in period has just ended. In response, eight of such enrolled, active call center personnel opt to become inactive. At 10:01 AM, the estimated wait time is twenty seconds which is below the upper threshold of four minutes and above the lower threshold of 10 seconds, so program 48 does not adjust the current wage offered to enrolled but inactive call center personnel. The foregoing corrective process continues as needed to keep the estimated wait time between the upper and lower thresholds.

Wage-setting program 48 can be loaded into call center server 20 from a computer readable media 70 such as magnetic tape or disk, optical media, DVD, semiconductor memory, memory stick, etc. or downloaded from the Internet via TCP/IP adapter card 72. Wage-setting program 48 is stored on computer-readable disk storage 26 for execution by processor 21 via computer-readable RAM 23.

Call routing program 28 can be loaded into call center server 20 from computer readable media 70 such as magnetic tape or disk, optical media, DVD, semiconductor memory, memory stick, etc. or downloaded from the Internet via TCP/IP adapter card 72. Call routing program 28 is stored on computer-readable disk storage 26 for execution by processor 21 via computer-readable RAM 23.

Wage-reviewing client programs 75*a-z* can be loaded into respective client workstations 60*a-z* from respective computer readable media 90*a-z* such as magnetic tape or disk, optical media, DVD, semiconductor memory, memory stick, etc. or downloaded from the Internet via respective TCP/IP adapter cards 92*a-z*. Wage-review client programs 75*a-z* are stored on computer-readable disk storages 66*a-z*, respectively for execution by processors 61*a-z* via computer-readable RAMs 63*a-z*.

Based on the foregoing, a computer system, method and program product for dynamically setting a wage for call center personnel have been disclosed. However, numerous modifications and substitutions can be made without deviating from the scope of the present invention. For example, program 48 can be modified to automatically adjust the wage of active call center personnel to the higher of the wage in effect at the start of each of their lock-in periods and the current wage offered to inactive call center personnel. Also, program 48 can be modified to automatically adjust the wage of active call center personnel to the lower of the wage in effect at the start of each of their lock-in periods and the current wage offered to inactive call center personnel. Also, program 48 can be modified to automatically adjust the wage of active call center personnel to the wage offered to inactive call center personnel during each wage setting interval so the wage paid to active call center personnel tracks the wage offered to inactive call center personnel. Also, program 48 can automatically reset the wage of active call center personnel to the wage offered to inactive call center personnel immediately upon a change to the wage offered to inactive call center personnel (regardless of when this occurs, even if the change is not synchronized with the end of a lock-in period of the active call center personnel). Also, program 48 can be modified to prevent any inactive call center personnel from joining the pool and becoming active if the estimated wait time is below the lower threshold. Also, the wage increment amount can be variable and based on the amount by which the estimated call wait time exceeds the upper threshold, and the wage decrement amount can be variable and based on the amount by which the estimated call wait time is below the lower threshold. Therefore, the present invention has been disclosed by way of illustration and not limitation, and reference should be made to the following claims to determine the scope of the present invention.

What is claimed:

1. A computer program product for dynamically setting a wage offered to a multiplicity of inactive call center personnel, the computer program product comprising:

a computer-readable, non-transitory storage device;

first program instructions to automatically estimate a wait time for a plurality of active call center personnel to handle calls to a call center:

second program instructions to automatically determine and set a wage, based in part on the estimated wait time, to offer to inactive call center personnel to become additional, active call center personnel to handle calls to the call center; and third program instructions, responsive to a request by one of the inactive call center personnel to become active at the wage, to automatically designate the one requesting inactive call center personnel as active at the wage and assign a call at the wage to the one requesting inactive call center personnel that has been designated as active; and wherein the second program instructions are responsive to the estimated wait time being greater than a predetermined upper threshold to determine and set the wage offered to the inactive call center personnel to be higher than a wage offered to inactive call center personnel during a prior interval in which the estimated wait time was lower than the upper threshold; and the first, second and third program instructions are stored on the computer-readable non-transitory storage device.

2. A computer program product for dynamically setting a wage offered to a multiplicity of inactive call center personnel, the computer program product comprising:

a computer-readable, non-transitory storage device:

first program instructions to automatically estimate a wait time for a plurality of active call center personnel to handle calls to a call center:

second program instructions to automatically determine and set a wage, based in part on the estimated wait time, to offer to inactive call center personnel to become additional, active call center personnel to handle calls to the call center; and third program instructions, responsive to a request by one of the inactive call center personnel to become active at the wage, to automatically designate the one requesting inactive call center personnel as active at the wage and assign a call at the wage to the one requesting inactive call center personnel that has been designated as active: and wherein the second program instructions are responsive to the estimated wait time being less than a predetermined lower threshold to determine and set the wage offered to the inactive call center personnel to be lower than a wage offered to inactive call center personnel during a prior interval in which the estimated wait time was greater than the lower threshold: and the first, second and third program instructions are stored on the computer-readable, non-transitory storage device.

3. A computer system for dynamically setting a wage offered to a multiplicity of inactive call center personnel, the computer system comprising:

one or more processors, one or more computer-readable memories and one or more computer-readable, non-transitory storage devices;

program instructions, stored on at least one of the one or more storage devices for execution by at least one of the one or more processors via at least one of the one or more memories, to automatically estimate a wait time for a plurality of active call center personnel to handle calls to a call center:

program instructions, stored on at least one of the one or more storage devices for execution by at least one of the one or more processors via at least one of the one or more memories, to offer to inactive call center personnel to become additional, active call center personnel to handle calls to the call center; and program instructions, stored on at least one of the one or more storage devices for execution by at least one of the one or more processors via at least one of the one or more memories, responsive to a request by one of the inactive call center personnel to become active at the wage, to automatically designate the one requesting inactive call center personnel as active at the wage and assign a call at the wage to the one requesting inactive call center personnel that has been designated as active; and wherein the program instructions to offer to inactive call center personnel are responsive to the estimated wait time being greater than a predetermined upper threshold to determine and set the wage offered to the inactive call center personnel to be higher than a wage offered to inactive call center personnel during a prior interval in which the estimated wait time was lower than the upper threshold.

4. A computer system for dynamically setting a wage offered to a multiplicitiy of inactive call center personnel, the computer system comprising:

one or more processors, one or more computer-readable memories and one or more computer-readable, non-transitory storage devices;

program instructions, stored on at least one of the one or more storage devices for execution by at least one of the one or more processors via at least one of the one or more memories, to automatically estimate a wait time for a plurality of active call center personnel to handle calls to a call center:

program instructions, stored on at least one of the one or more storage devices for execution by at least one of the one or more processors via at least one of the one or more memories, to offer to inactive call center personnel to become additional, active call center personnel to handle calls to the call center; and program instructions stored on at least one of the one or more storage devices for execution by at least one of the one or more processors via at least one of the one or more memories, responsive to a request by one of the inactive call center personnel to become active at the wage, to automatically designate the one requesting inactive call center personnel as active at the wage and assign a call at the wage to the one requesting inactive call center personnel that has been designated as active; and wherein the program instructions to offer to inactive call center personnel are responsive to the estimated wait time being less than a predetermined lower threshold to determine and set the wage offered to the inactive call center personnel to be lower that a wage offered to inactive call center personnel during a prior interval in which the estimated wait time was greater than the lower threshold.

* * * * *